United States Patent [19]

Mulas et al.

[11] 4,140,324

[45] Feb. 20, 1979

[54] METHOD FOR OBTAINING A COMPOUND CLAMPING RING AND A COMPOUND CLAMPING RING SO OBTAINED

[75] Inventors: Piero Mulas, Genoa; Carmelo Leoncini, Genoa-Sampierdarena, both of Italy

[73] Assignee: F.I.P. Formatura Iniezione Polimeri S.p.A., Italy

[21] Appl. No.: 749,758

[22] Filed: Dec. 13, 1976

[30] Foreign Application Priority Data

Dec. 31, 1975 [IT] Italy .............................. 12955 A/75

[51] Int. Cl.² .............................................. F16J 15/12
[52] U.S. Cl. ..................................... 277/224; 285/21; 285/423; 277/235 R
[58] Field of Search ........... 277/170, 171, 172, 207 A, 277/224, 235; 285/21, 104, 105, 423

[56] References Cited

U.S. PATENT DOCUMENTS

| 2,209,235 | 7/1940 | Nathan | 277/170 |
| 2,991,092 | 7/1961 | MacKay | 277/235 |
| 3,815,940 | 6/1974 | Luckenbull | 285/423 |

FOREIGN PATENT DOCUMENTS 417246  1/1967  Switzerland.

Primary Examiner—Herbert F. Ross
Attorney, Agent, or Firm—Robert E. Burns; Emmanuel J. Lobato; Bruce L. Adams

[57] ABSTRACT

A clamping ring in a joint sleeve for pipes, with a compound structure comprising a metal tooth among synthetic material teeth on an inner surface of the ring. In this way said ring assures an efficient clamping effect, without the drawbacks met by hard metal rings with respect to synthetic material rings.

3 Claims, 6 Drawing Figures

METHOD FOR OBTAINING A COMPOUND CLAMPING RING AND A COMPOUND CLAMPING RING SO OBTAINED

BACKGROUND OF THE INVENTION

The present invention relates to an improved method for obtaining a compound clamping ring and a compound clamping ring so obtained.

It is known that pipes are usually connected through joint sleeves provided inside with clamping rings. Said clamping rings, of known type, have an outer conical surface which allows them to be shaped wedge-like, and inside have a toothed surface suitable to grip the outer surface of the pipes to be connected. Further, said clamping rings are provided with a radial cut or gap which allows the required diameter reduction thereof when they are put in position. It is further known that the efficiency of said clamping rings is related to their capacity of penetrating, by their mentioned toothed surface, the outer surface of the pipes to be connected, and that depends on the relative hardness of said clamping rings with respect to the hardness of the pipes to be connected.

Therefore, it would be obvious to use clamping rings of the above kind made of relatively hard metal, even when the pipes to be connected are made of a light alloy or a synthetic material.

On the other hand, a clamping ring of hard metal has, from the points of view of the cost and weight, substantial drawbacks with respect to a clamping ring made of a light alloy or synthetic material.

OBJECTS OF THE INVENTION

In view of the foregoing, the invention aims at achieving the following objects:
to assure an efficient clamping effect of said rings;
to avoid the drawbacks of hard metal rings.

SUMMARY OF THE INVENTION

The clamping ring according to the invention has a compound or composit integral structure, comprising a metal angular element having a metal tooth among synthetic material teeth provided on its inner surface. Obviously, said metal annular element must remain embedded within the mass of the clamping ring of synthetic material.

For obtaining such a compound clamping ring, a first method comprises arranging said metal element in the mold where the clamping ring of synthetic material will be formed. A second method uses ultrasonics to weld the metal element within an annular body of synthetic material.

BRIEF DESCRIPTION OF THE DRAWINGS

In order that the invention may be clearly understood, it will now be described by way of example, with reference to the accompanying drawings wherein.

DESCRIPTION OF A PREFERRED EMBODIMENT

Figure 1:
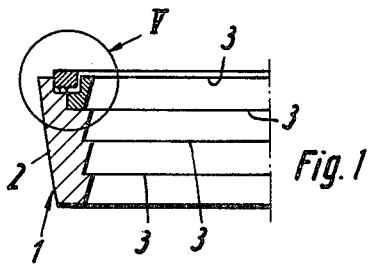
FIG. 1 shows a broken radial section of a clamping ring according to the invention, before its components are assembled.
Figure 3:
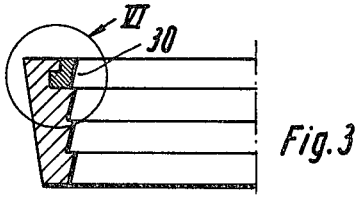
FIGS. 3 and 4 are similar to FIGS. 1 and 2, illustrating the clamping ring after its components have been assembled.
Figure 2:
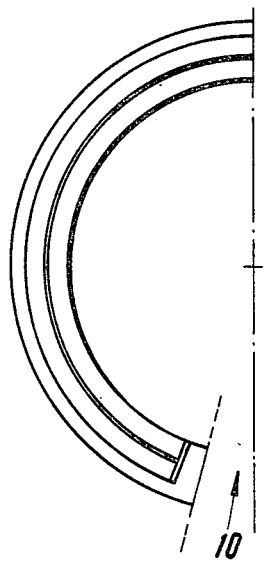
FIG. 2 is a broken plan view of the ring of FIG. 1.
Figure 4:
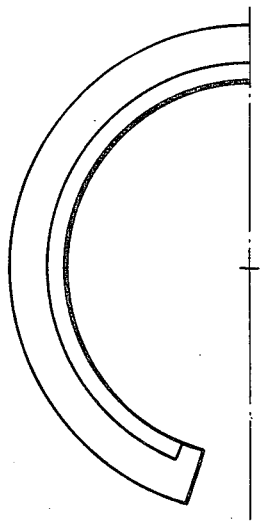
Figure 5:
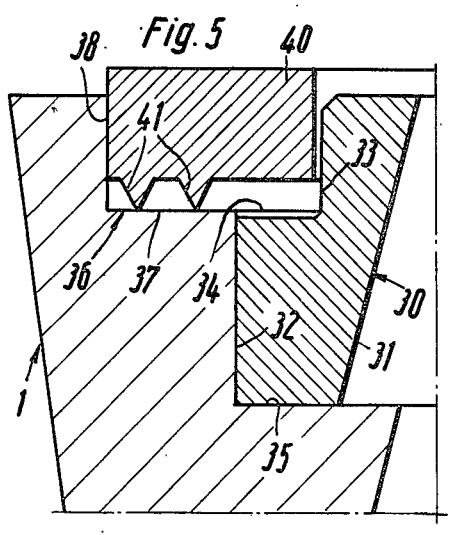
FIGS. 5 and 6 show enlarged details of FIGS. 1 and 3.

As shown in the drawings, clamping ring 1 is of the type comprising a truncated conical outer surface 2 and an inner surface provided with asymmetric circumferential teeth 3, said teeth being suitable to facilitate the positioning of said clamping ring and to prevent its return, thanks to the clamping action exerted by the short sides of said teeth.

In order to obtain the radial tightening, said ring 1 is provided with a radial cut or gap 10.

According to the invention, the clamping ring is made of synthetic material except for an annular metal element 30 comprising one of the teeth 3. Particularly, said annular metal element 30 is arranged near the longer base of said clamping ring 1.

Said metal element is embedded within the surrounding synthetic material, so as to prevent its removal therefrom after its positioning. To this end, said annular metal element 30 is provided inside with a conical surface 31 and is defined outside by two cylindric surfaces 32 and 33 joined by an annular step or shoulder 34.

Said metal element is seated on an annular step 35 provided on the inner surface of said ring 1.

Said inner surface of ring 1 further comprises a second inner circumferential step 36 consisting of an axial abutment surface 37, lying on the same plane as surface 34, and a cylindric surface 38. The step portions 35 and 36 together define an annular circumferential recess in an annular end face of the ring 1 and which is open at the inner surface of the ring.

Therefore, after said metal element 30 has been positioned between the cylindric surfaces 33, 38 and the aligned flat surfaces 34, 37, an annular space is defined suitable to receive a locking ring 40, of synthetic material, for said metal element 30.

Said ring 40 is provided on its bottom, according to a preferred embodiment of the invention, with teeth 41.

Figure 6:
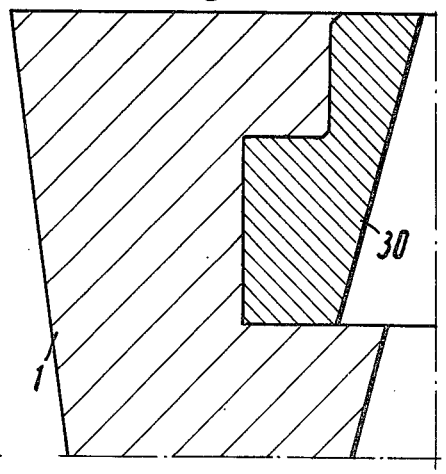

Under the action of a pressure, denoted schematically by P, in the presence of ultrasounds, if the ring 40 is of the same material as synthetic ring 1, the lower surface of said locking ring 40 and its outer side surface weld to the flat abutment surface 37 and the cylindric surface 38 of step 36 to form a single body of synthetic material with the metal ring 30 embedded therein. After such a welding, the whole of said three elements 1, 30, 40 has the final appearance shown in FIG. 6.

By this method the metal ring 30 is embedded within the mass of synthetic material of ring 1, as an alternative to the arrangement of the metal element 30 within the mold for said ring 1. This is a second embodiment of the method according to the invention.

It is to be understood that the invention is not limited to the examples shown. It is intended to cover all modifications and equivalents within the scope of the appended claims.

What we claim is:

1. A clamping ring comprising: an annular body of synthetic material having a radial gap and a truncated conical outer lateral surface, a pair of annular end faces and an inner surface including a plurality of circumferential teeth protruding therefrom and defining clamping ring teeth, one of said annular end faces having an annular circumferential recess therein open at said inner surface; an annular metallic member having a radial gap and dimensioned to be received within the circumferential recess of said annular body and including an inner surface portion defining a metallic inwardly projecting circumferential tooth, said annular metallic member positioned within the circumferential recess of said annular body with the respective radial gaps of said annular body and said annular metallic member coinciding and with said metallic inwardly projecting circumferential tooth defining a clamping ring tooth, said annular circumferential recess having a depth sufficient to completely receive said annular metallic member therein with space remaining; and a locking ring having a radial gap and dimensioned to fit within the remaining space of the annular circumferential recess and at least partially overlie a portion of said annular metallic member for locking said annular metallic member within the circumferential recess, and said locking ring positioned within the remaining space of the circumferential recess with the radial gap of said locking ring coinciding with the respective radial gaps of said annular body and said annular metallic member.

2. A clamping ring according to claim 1, wherein said annular metallic member has an outer lateral surface including a circumferential step portion, and wherein said locking ring is complementary to said circumferential step portion and is received therein for locking said annular metallic member when said locking ring is within the remaining space of the circumferential gap.

3. A clamping ring according to claim 1, wherein said locking ring is made of synthetic material and is integrated with the annular body of synthetic material for embedding said annular metallic member therein.

* * * * *